G. L. W. PALMER.
PROJECTING APPARATUS.
APPLICATION FILED NOV. 7, 1913.
1,141,885.
Patented June 1, 1915.
3 SHEETS—SHEET 1.
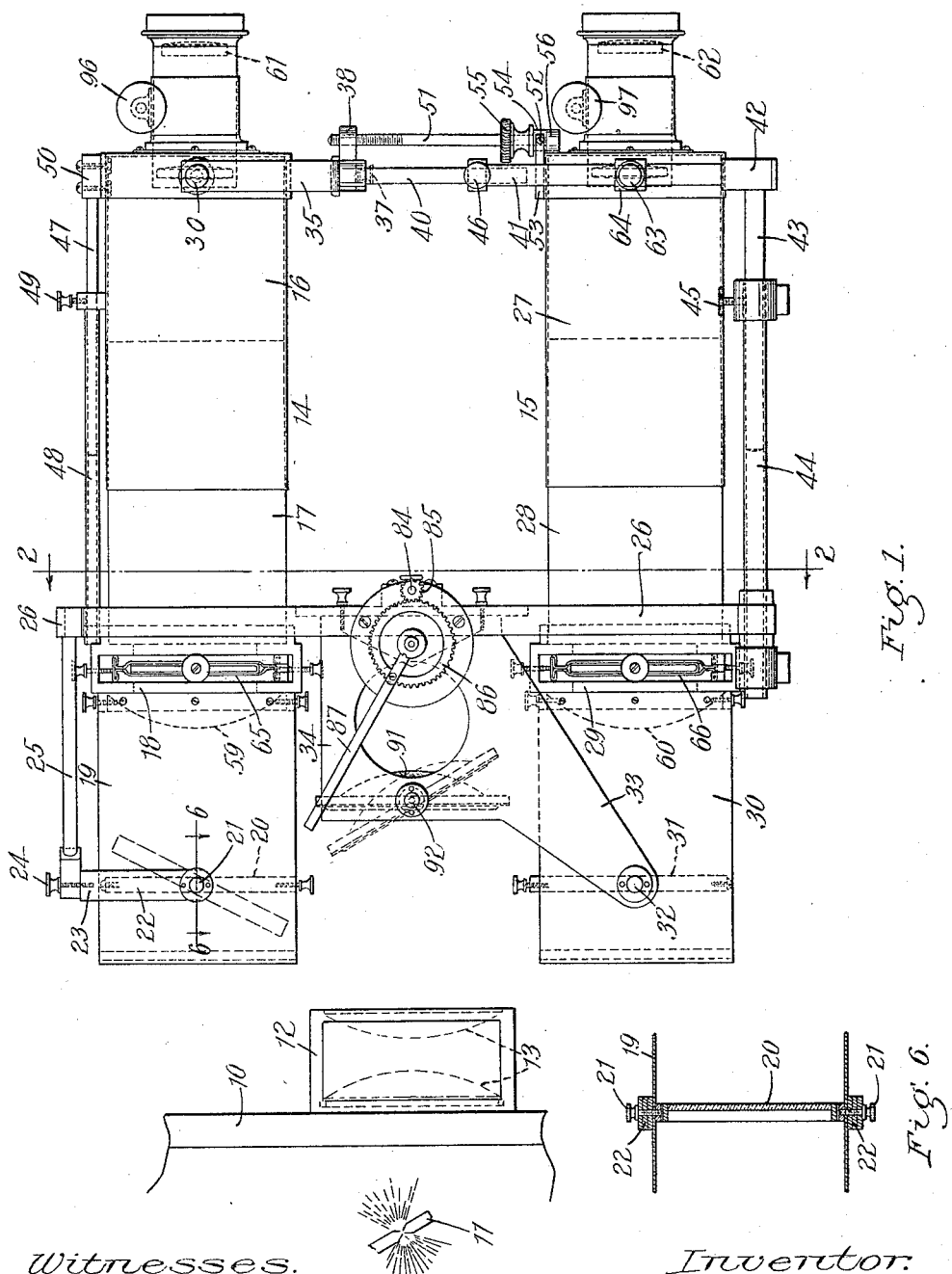

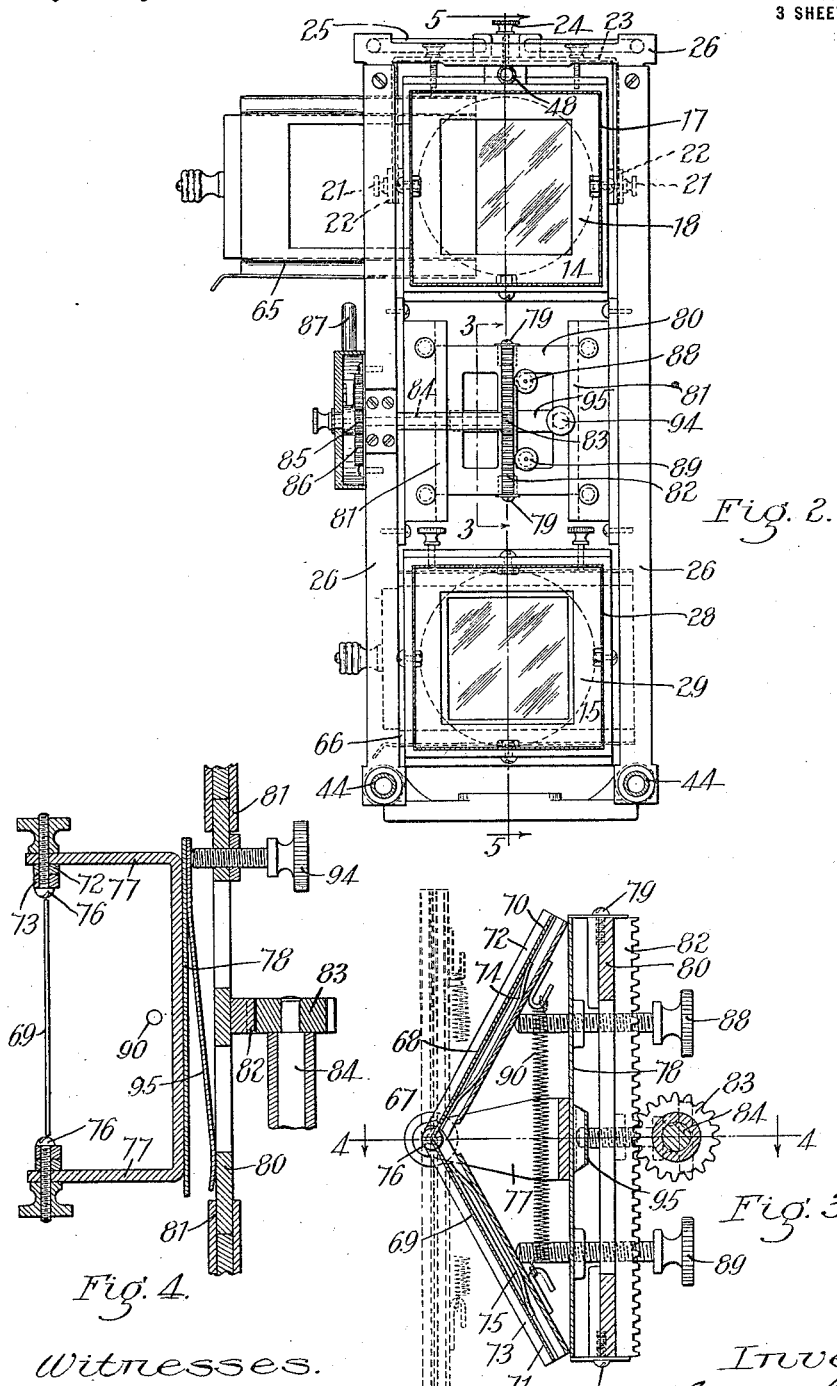

G. L. W. PALMER.
PROJECTING APPARATUS.
APPLICATION FILED NOV. 7, 1913.
1,141,885.
Patented June 1, 1915.
3 SHEETS—SHEET 3.
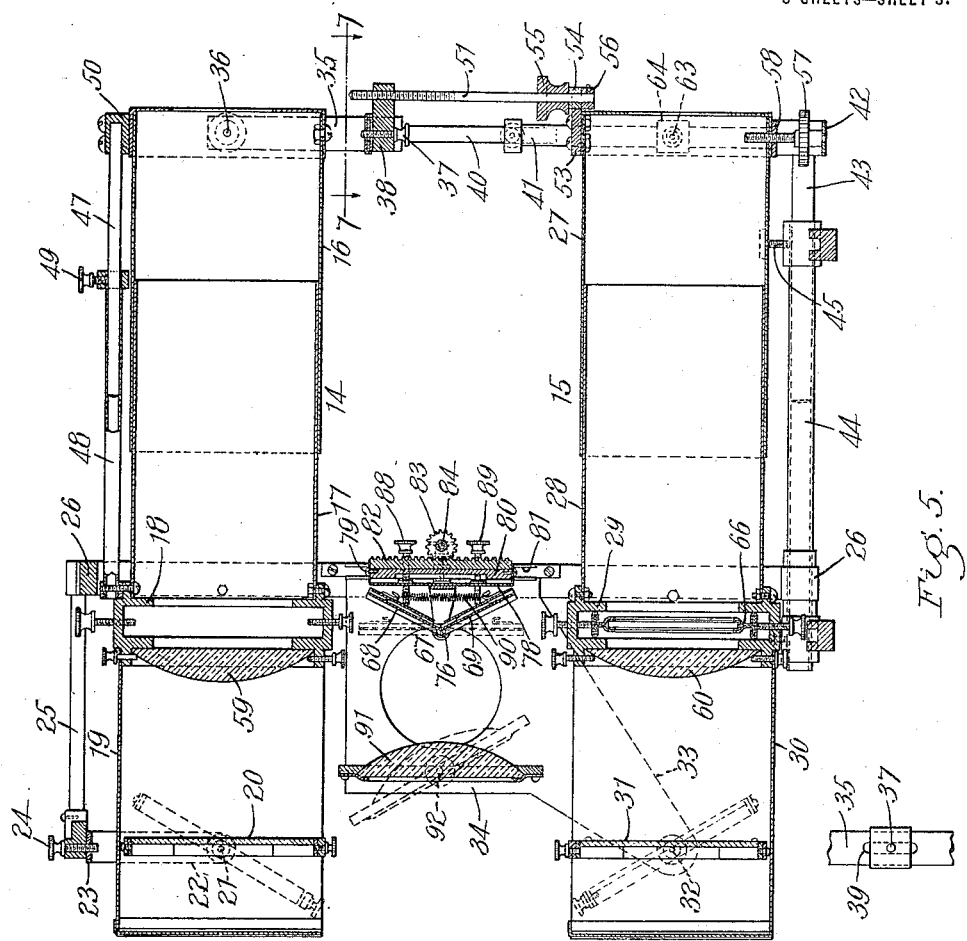
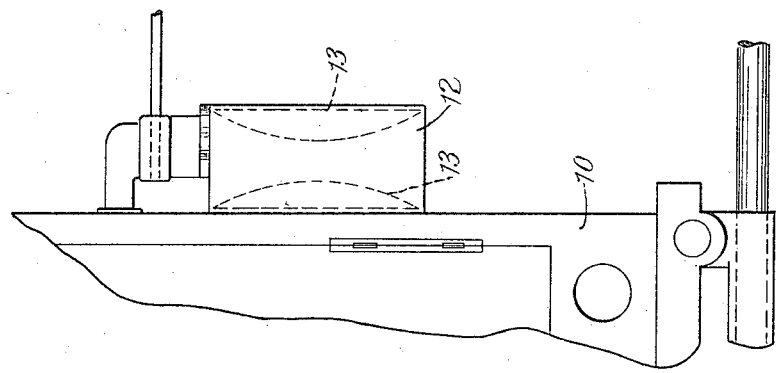
Witnesses
Franklin E. Low.
Ambrose E. Sullivan
Inventor:
George L. W. Palmer,
by his attorney, Jules J. Gooding.

UNITED STATES PATENT OFFICE.

GEORGE L. W. PALMER, OF CAMBRIDGE, MASSACHUSETTS, ASSIGNOR TO GREENE M-F-G. CO., OF BOSTON, MASSACHUSETTS, A CORPORATION OF MASSACHUSETTS.

PROJECTING APPARATUS.

1,141,885. Specification of Letters Patent. Patented June 1, 1915.

Application filed November 7, 1913. Serial No. 799,797.

*To all whom it may concern:*

Be it known that I, GEORGE L. W. PALMER, a citizen of the United States, residing at Cambridge, in the county of Middlesex and State of Massachusetts, have invented new and useful Improvements in Projecting Apparatus, of which the following is a specification.

This invention relates to a projecting apparatus adapted to project rays of light through a transparent picture slide or film.

The object of the invention is to provide, in an apparatus of the character set forth, means for causing one picture which is projected on a screen by said apparatus to gradually fade or dissolve while another picture takes its place.

Another object of my invention is to obtain this result without heating, except to a very slight extent, a glass or film upon which the picture appears. It is very important in all cases that the film or glass upon which the picture is superimposed should be free from excessive heat and this is especially true in cases where medical slides are used, upon which tissues, germs and the like are placed for projection, for the purpose of being thrown upon a screen in enlarged form and used for matters of scientific research or in lectures upon different scientific subjects.

The object of the invention is further to provide an apparatus of the character set forth in which rays of light from a single lantern may be deflected into two tubes simultaneously and then changed so that all of said rays are deflected into one of said tubes, whereby one of the pictures projected upon a screen gradually fades away while the other of said pictures projected on said screen will increase in like proportion in intensity, this change being made so gradually that the observer of the picture on the screen sees one picture gradually changing into another without any perceptible step between. For example, assuming one of the pictures on the slide to be a red rose and the picture on the other slide to be a white rose, matted equally in the same position; by the use of my invention one of said roses can be made to change into the other without any perceptible step between being visible to the eye of the observer while making said change.

The invention resides, primarily, in means whereby rays of light from a single lantern may be projected into two tubes simultaneously and then changed so that said rays of light will be projected entirely through either one of said tubes, thus making it possible to cause either of the pictures to dissolve one into the other. The particular means by which this result is obtained consists in a deflector located out of alinement with said tubes and means for moving said deflector transversely of the rays of light projected thereon.

The invention further consists in the construction of, and means for operating, said deflector, said construction consisting in the combination of two converging mirrors, the planes of their reflecting surfaces intersecting in a line extending transversely of the rays of light projected upon said deflector, said line being substantially coincident with the median axial line about which said mirrors are adapted to be moved, so that they assume different angles relatively to each other without the adjacent edges of the mirrors becoming separated.

The invention further consists in the combination and arrangement of parts set forth in the following specification and particularly pointed out in the claims thereof.

Referring to the drawings: Figure 1 is a side elevation of my improved projecting apparatus showing a portion of a lantern house connected therewith broken away. Fig. 2 is a sectional elevation taken on line 2—2 of Fig. 1, showing one of the slide holders partly withdrawn and the other in position. Fig. 3 is a sectional elevation enlarged taken on line 3—3 (Fig. 2) illustrating a deflector and means for adjusting the parts thereof at different angles. Fig. 4 is a detail section illustrating the deflector apparatus taken on line 4—4 of Fig. 3. Fig. 5 is a sectional elevation taken on line 5—5 of Fig. 2, with the projecting lenses removed. Fig. 6 is a detail section taken on line 6—6 of Fig. 1. Fig. 7 is a sectional plan taken on line 7—7 of Fig. 5.

Like numerals refer to like parts throughout the several views of the drawings.

In the drawings, 10 is a lamp house provided with the usual arc or other light 11 and with the usual thimble 12 to form a support for the lenses 13.

14 and 15 are two tubes. The tube 14 consists of two sheet metal tubes 16 and 17 adapted to telescope one into the other. The tube 17 is rigidly fastened to a slide holder frame 18. Another tube 19 at the rear end of the tube 14 is also fastened to said slide holder frame, and in this tube 19 is located a mirror 20 constituting a reflector. Said mirror is pivoted upon screws 21 at opposite sides thereof and said screws have screw-threaded engagement with the arms 22 of a U-shaped bracket 23 projecting through the tube 19, thus constituting pivots for the tube 14 as a whole, whereby the median axial line of the mirror 20 and the tube 14 are coincident. Said bracket 23 is fastened by a screw 24 to a bracket 25 which is rigidly fastened to the framework 26 of the machine.

The tube 15 is similar in its construction to the tube 14 and consists of two sheet metal tubes 27 and 28 telescoping one into the other, the tube 28 being fastened rigidly to a slide holder frame 29. A tube 30 at the rear end of the tube 15 and constituting a part thereof is fastened to the slide holder frame 29, and within said tube is pivotally mounted a mirror or reflector 31. Screws 32 constitute the pivots for the mirror 31 upon opposite sides thereof, respectively, and these screws have screw-threaded engagement with the arms 33 of brackets 34 which are fastened to the frame 26 of the machine. The screws 32 project through the opposite sides, respectively, of the tube 30 and constitute pivots not only for the mirror 31, but also for the tube 15 as a whole. Thus the median axial lines of the mirror 31 and of the tube 15 coincide. It will thus be seen that the two tubes 14 and 15 are pivotally mounted at 21 and 32, respectively, upon the frame of the machine. The forward ends of the tubes 14 and 15 are adjustable relatively to each other and said tubes are both adjustable together upon their pivots 21 and 32 by means which will now be described.

A U-shaped bracket 35 is connected by screws 36 to the forward end of the tube 16 and is adjustably fastened by a screw 37 to a cross-bar 38, said screw 37 extending through a slot 39 in said cross-bar 38, whereby said U-shaped bracket 35 may be moved transversely of the machine and locked in any desired position to the cross-bar 38 of the frame. The cross-bar 38 is rigidly fastened to vertical rods 40 which have telescopic engagement with tubes 41 fastened at their lower ends to a cross-bar 42 which has extending rearwardly therefrom rods 43, these rods having telescopic engagement with tubes 44 fast to the lower end of the frame 26 and being held in fixed relation thereto by means of set-screws 45. The rods 40 are held in fixed relation to the tubes 41 by means of set-screws 46.

A centrally disposed rod 47 has telescopic engagement with a tube 48 and is held in fixed relation thereto by a set-screw 49. The rod 47 is rigidly fastened to the front end of the tube 14 by a plate 50 and the tube 48 is rigidly fastened to the slide holder frame 18.

The tube 14 is adjusted laterally thereof relatively to the tube 15 by means of a rod 51 which has screw-threaded engagement with the cross-bar 38 at its upper end and at its lower end is pivotally connected at 52 to a bracket 53 fastened to the front end of the tube 15. The pivotal screws 52 engage a collar 54 within which the rod 51 is rotatable. The rod 51 is prevented from moving longitudinally in the collar 54 by collars 55 and 56 fast to the rod 51 and located above and below the collar 54, respectively, so that by rotating the rod 51 by means of the collar 55, the tube 14 may be raised or lowered at its front end tipped upon its pivotal screws 21.

The tubes 14 and 15 may be simultaneously tipped upon their respective pivots 21 and 32 by means of the adjusting screw 57 which has screw-threaded engagement with a boss 58 on the lower front end of the tube 15. The lower end of this screw 57 bears against the cross-bar 42 and by rotating said screw 57 both the tubes 14 and 15 may be tipped upon their respective pivots 21 and 32 simultaneously.

A plano-convex lens 59 is fastened to the slide holder frame 18 and another plano-convex lens 60 is fastened to the slide holder frame 29. The tubes 14 and 15 are provided at their front ends with projecting lenses 61 and 62, respectively, in the usual manner. The front end of the tube 15 is rigidly fastened to the tubes 41 by set-screws 63 which have screw-threaded engagement with brackets 64, said brackets being fastened to the front end of said tube 15.

In the slide holder frames 18 and 29 there are provided slide holders 65 and 66, respectively, of the usual construction and adapted to hold slides upon which the pictures to be thrown upon the screen are superimposed.

A deflector 67 is located between the two tubes 14 and 15. This deflector consists of two converging mirrors 68 and 69. These mirrors are adapted to slide in grooves 70 and 71 which are provided in the mirror frames 72 and 73, respectively, and are held against accidental displacement by flat springs 74 and 75. Said mirror frames are pivoted at their opposite edges upon pivots 76, said pivots being fastened to arms 77 upon an auxiliary frame 78. The planes of the reflecting surfaces of said mirrors intersect in a line extending transversely thereof and each of said mirrors is adapted to reflect rays of light into one of the tubes 14 or 15.

The auxiliary frame 78 is pivotally mounted upon two screws 79 constituting pivots and having screw-threaded engagement with a slide 80. Said slide is adapted to be moved vertically in ways 81 upon the frame of the machine and has a rack 82 fast thereto and meshing into a pinion 83 which is fastened to a shaft 84 rotatably mounted upon the frame of the machine and having fastened to its front end a pinion 85. The pinion 85 meshes into a gear 86 which is rotatably mounted on the frame of the machine and is rotated by means of a handle 87 fast thereto.

The inclination of the converging mirrors 68 and 69 to each other may be changed by means of adjusting screws 88 and 89, respectively, said screws having screw-threaded engagement with the auxiliary frame 78 and bearing at their ends against the backs of the mirror frames 72 and 73, and said mirror frames are held in contact with the ends of said adjusting screws by means of a spring 90 which is connected at its opposite ends to said mirror frames.

A plano-convex condensing lens 91 is pivotally mounted by means of screws 92 to the bracket 34 and is located between the deflector 67 and the lens 13.

In order to tip the deflector about the median axial line of its pivotal screw 79 and thus adjust the deflector about a vertical axis, a screw 94 is provided which has screw-threaded engagement with the slide 80 and bears at its end against the auxiliary frame 78. A flat spring 95 is fastened at one end thereof to the auxiliary frame 78 and at the other end thereof it bears against the slide 80. Said flat spring holds the auxiliary frame 78 in contact with the end of the adjusting screw 94, and by rotating said screw in one direction or the other said auxiliary frame 78 and the deflector carried thereby may be rocked about a vertical axis constituting the median axial line of the pivotal screws 79.

The general operation of the device hereinbefore described is as follows: Rays of light from the lens 13 pass through the condenser lens 91 and focus at a point between said lens 91 and the mirrors 68 and 69 from which they diverge and impinge against the surfaces of said mirrors. The rays are projected from the mirrors 68 and 69 into the tubes 14 and 15, respectively, and against the mirrors 20 and 31 located in the rear ends of said tubes. These mirrors are set at suitable angles to reflect the rays thus projected into the tubes 14 and 15 onto the condensing lenses 59 and 60, respectively, from which they pass through the slides upon which the pictures are located and through said tubes 14 and 15 and out through the projecting lenses 61 and 62, respectively, at the forward ends of said tubes 14 and 15 and thence are projected onto the screen. With the deflector 67 in its central position between the tubes 14 and 15, a portion of the rays will be deflected onto the mirror 20 and another portion onto the mirror 31.

If it is desired to have the picture in the slide holder 66 appear on the screen, then the deflector 67 is raised by rotating the gear 86, which rotates the pinion 85, shaft 84 and pinion 83 and raises the rack 82, so that the deflecting mirror 69 will deflect all of the rays of light into the tube 15 and against the mirror 31 which, in turn, will reflect said rays through the condensing lens 60 through the plate in the holder 66 and through the projecting lens 62 onto the screen. On the contrary, if it is desired to have the picture which is in the slide holder 66 disappear from the screen or "dissolve" while the picture which is on the slide 65 is thrown upon the screen, the gearing hereinbefore described will be rotated in the proper direction to move the slide 80 downwardly, carrying the deflector 67 with it until all the rays of light are reflected from the mirror 68 into the tube 14 against the mirror 20 which, in turn, reflects the rays through the lens 59 and through the slide in the slide holder 65 through the projecting lens 61 onto the screen.

It will be seen that each of the mirrors 30 and 31 can be tipped at any desired angle upon their pivots 21 and 32, respectively; that the condensing lens 91 can be tipped at any desired angle upon its pivot 92 and that the deflector 67 can be tipped at any desired angle upon its vertical pivots 79; that its mirrors can be tipped at any desired angle relatively to each other by adjusting the screws 88 and 89 and that the adjacent edges of said mirrors will always keep in contact with each other, with the line of intersection of their reflecting surfaces coincident with the median axial line of their pivots 76, said mirrors being held firmly in position in their grooves by the springs 74 and 75 and having their adjacent edges in frictional contact with each other.

The lenses 61 and 62 are adjusted in the usual manner by means of adjusting screws 96 and 97, respectively.

In order to adjust the tubes 14 and 15 so that the pictures thrown upon the screen from said tubes shall be located in exactly the same position upon the screen, the tube 14 is adjusted upwardly or downwardly at its forward end by means of the adjusting rod 51, as hereinbefore described. In order to move the picture upwardly or downwardly bodily upon the screen both of said tubes may be adjusted at their forward ends by means of the adjusting screw 57, as hereinbefore described.

In order to change the length of the tubes 14 and 15, the rods 47 and 43 are slid in the tubes 48 and 44, respectively, and are locked in position by the set-screws 49 and 45.

Having thus described my invention, what I claim and desire by Letters Patent to secure is:

1. A projecting apparatus having, in combination, two tubes, a reflector in the rear end of each of said projecting tubes, a lens in each of said tubes, respectively, located in front of said reflectors and a mirror movable as one part located out of alinement with said tubes and adapted to deflect rays of light projected thereon against said reflectors.

2. A projecting apparatus having, in combination, two projector tubes, a reflector in the rear end of each of said tubes, a lens in each of said tubes respectively located in front of said reflectors and a deflector located out of alinement with said tubes and adapted to deflect rays of light projected thereon against said reflectors and means arranged to guide said deflector so that the same may be moved transversely of said rays of light and toward and away from each of said tubes, respectively, whereby said rays of light may all gradually be deflected to one of said reflectors.

3. A projecting apparatus having, in combination, two projector tubes, a reflector in the rear end of each of said tubes, a lens in each of said tubes, respectively, located in front of said reflectors, a deflector located out of alinement with said tubes and adapted to deflect rays of light projected thereon against said reflectors and means adapted to move said deflector transversely of said rays of light and toward and away from each of said tubes, respectively, whereby said rays may all gradually be deflected to one of said reflectors.

4. A projecting apparatus having, in combination, two projector tubes, a mirror located in the rear end of each of said projector tubes, a deflector adapted to simultaneously deflect rays of light into said tubes by the same may be moved transversely of said rays of light and toward and away from each of said tubes, respectively, and means adapted to guide said deflector whereby the same may be moved transversely of said rays of light toward and away from said tubes, respectively, and whereby said rays may all gradually be deflected into one of said tubes.

5. A projecting apparatus having, in combination, two projecting tubes, a mirror located in the rear end of each of said projector tubes, a deflector adapted to simultaneously deflect rays of light into said tubes and means adapted to move said deflector transversely of said rays of light and toward and away from each of said tubes, respectively, whereby said rays may all be gradually deflected into one of said tubes.

6. A projecting apparatus having, in combination, two projecting tubes, a mirror movable as one part adapted to simultaneously deflect rays of light into said tubes and means located in said tubes to reflect the rays projected thereinto longitudinally thereof, and ways arranged to guide said mirror so that the same may be slid transversely of said rays of light and toward and away from each of said tubes, respectively, whereby said rays of light may all gradually be deflected to the reflecting means located in one of said tubes.

7. A projecting apparatus having, in combination, two projector tubes, a mirror located in the rear end of each of said projector tubes, a deflector movable as one part located out of alinement with said tubes and embodying two converging mirrors each adapted to deflect rays of light into one of said tubes, respectively, and means to guide said deflector transversely of said rays of light and toward and away from each of said tubes, respectively, whereby said deflector may be moved transversely of said rays of light and toward and away from each of said tubes, respectively, and whereby said rays may all gradually be deflected into one of said tubes.

8. A projecting apparatus having, in combination, two projector tubes, a mirror located in the rear end of each of said projector tubes, a deflector located out of alinement with said tubes and embodying two converging mirrors movable as one part, each adapted to deflect rays of light into one of said tubes, respectively, and means adapted to move said mirrors transversely of said rays of light.

9. A projecting apparatus having, in combination, two projector tubes, a mirror located in the rear end of each of said projector tubes, a deflector located out of alinement with said tubes and embodying two converging mirrors movable as one part and means adapted to project rays of light against said deflector, the planes of the reflecting surfaces of said mirrors intersecting in a line extending transversely of said rays of light, each of said mirrors adapted to deflect rays of light into one of said tubes, respectively.

10. A projecting apparatus having, in combination, two projector tubes, a mirror located in the rear end of each of said projector tubes, a deflector located out of alinement with said tubes and embodying two converging mirrors, means adapted to project rays of light against said deflector, the planes of the reflecting surfaces of said mirrors intersecting in a line extending transversely of said rays of light, each of said mirrors adapted to deflect rays of light into one of said tubes, respectively, and means to move said deflector transversely of said rays of light, and toward and away from each of said tubes, respectively.

11. A projecting apparatus having, in combination, two projector tubes, a mirror located in the rear end of each of said projector tubes, a deflector located out of alinement with said tubes and embodying two converging mirrors, means adapted to project rays of light against said deflector, the planes of the reflecting surfaces of said mirrors intersecting in a line extending transversely of said rays of light, each of said mirrors adapted to deflect rays of light into one of said tubes, respectively, and means adapted to change the angle of said mirrors to each other.

12. A projecting apparatus having, in combination, two projector tubes, a mirror located in the rear end of each of said projector tubes, a deflector located out of alinement with said tubes and embodying two converging mirrors, means adapted to project rays of light against said deflector, the planes of the reflecting surfaces of said mirrors intersecting in a line extending transversely of said rays of light, each of said mirrors adapted to deflect rays of light into one of said tubes, respectively, means adapted to change the angle of said mirrors to each other and means adapted to move said deflector transversely of said rays of light, and toward and away from each of said tubes, respectively.

13. A projecting apparatus having, in combination, two projector tubes, a mirror located in the rear end of each of said projector tubes, a deflector located out of alinement with said tubes and embodying two converging mirrors pivotally mounted and having a common median axial line, and means adapted to project rays of light against said deflector, the planes of the reflecting surfaces of said mirrors intersecting in a line extending transversely of said rays and substantially coincident with said median axial line, each of said mirrors adapted to deflect rays of light into one of said tubes, respectively.

14. A projecting apparatus having, in combination, two projector tubes, a mirror located in the rear end of each of said projector tubes, a deflector adapted to simultaneously deflect rays of light into said tubes, means adapted to move said deflector transversely of said rays of light and toward and away from each of said tubes, respectively, whereby said rays may all be gradually deflected into one of said tubes, and means adapted to set said deflector at different angles to a plane extending transversely of both of said tubes.

15. A projecting apparatus having, in combination, two projector tubes, a mirror located in the rear end of each of said projector tubes, a deflector embodying two converging mirrors, each adapted to deflect rays of light into one of said tubes, respectively, said converging mirrors being out of alinement with said tubes, the planes of the reflecting surfaces of said mirrors intersecting in a line extending transversely of said rays of light, a slide upon which said mirrors are pivotally mounted and mechanism adapted to move said slide transversely of said rays of light, and toward and away from each of said tubes, respectively.

16. A projecting apparatus having, in combination, two projector tubes, a mirror located in the rear end of each of said projector tubes, a deflector embodying two converging mirrors, each of said mirrors adapted to reflect rays of light into one of said tubes, respectively, the planes of the reflecting surfaces of said mirrors intersecting in a line extending transversely of said rays, two frames upon which said mirrors are slidably mounted, an auxiliary frame upon which said mirror frames are pivotally mounted, said mirror frames having a common median axial line, a slide upon which said auxiliary frame is pivotally mounted, the median axial line of said auxiliary frame extending substantially at right angles to the median axial line of said mirror frames and mechanism adapted to move said slide transversely of said rays of light, and toward and away from each of said tubes, respectively.

17. A projecting apparatus having, in combination, two projector tubes a mirror located in the rear end of each of said projector tubes, a deflector embodying two converging mirrors, each of said mirrors being out of alinement with said tubes and adapted to project rays of light into one of said tubes, respectively, a frame for each of said mirrors, an auxiliary frame upon which said mirror frames are pivotally mounted, said mirror frames having a common median axial line extending transversely of said rays of light, a slide upon which said auxiliary frame is pivotally mounted, the median axial line of said auxiliary frame extending transversely of said rays of light and of the median axial line of said mirror frames, mechanism adapted to impart a movement to said slide transversely of said rays of light and toward and away from each of said tubes, respectively, yielding means connecting said mirrors to each other and adjusting screws on said auxiliary frame adapted to bear against said mirror frames, whereby the angles of said frames and of the mirrors carried thereby relatively to each other may be changed.

18. A projecting apparatus having, in combination, a frame, two projector tubes, a mirror located in the rear end of each of said projector tubes, each pivotally mounted on said frame, means adapted to tilt one of said tubes on its pivot, whereby one of said tubes may be adjusted relatively to the other, means adapted to simultaneously tilt both of said tubes on said frame, a deflector adapted to simultaneously deflect rays of light into said tubes and means adapted to move said deflector transversely of said rays of light and toward and away from each of said tubes, respectively, whereby said rays may all be gradually deflected into one of said tubes.

19. A projecting apparatus having, in combination, a frame, two projector tubes, a mirror located in the rear end of each of said projector tubes, pivoted adjacent to their rear ends to said frame, adjusting means connecting the opposite ends of said tubes, means to lock said tubes together at their forward ends, means adapted to simultaneously tilt both of said tubes upon their respective pivots and a deflector adapted to simultaneously deflect rays of light into said tubes and means adapted to move said deflector transversely of said rays of light, and toward and away from each of said tubes, respectively, whereby said rays may all gradually be deflected into one of said tubes.

20. A projecting apparatus having, in combination, two projector tubes, a mirror located in the rear end of each of said projector tubes, a deflector movable as one part located out of alinement with said tubes, means adapted to project rays of light onto said deflector, said deflector adapted to simultaneously deflect said rays of light into said tubes and means to guide said deflector whereby the same may be moved transversely of said rays of light and whereby said rays may all gradually be deflected into one of said tubes.

21. A projecting apparatus having, in combination, two projector tubes, a mirror located in the rear end of each of said projector tubes, a deflector out of alinement with said tubes, means adapted to project rays of light onto said deflector, said deflector adapted to simultaneously deflect said rays of light into said tubes, and means adapted to move said deflector transversely of said rays of light, and toward and away from each of said tubes, respectively, whereby said rays may all gradually be deflected into one of said tubes.

22. A projecting apparatus having, in combination, two projector tubes, a reflector in the rear end of each of said tubes, a lens in each of said tubes respectively located in front of said reflectors, a deflector movable as one part located out of alinement with said tubes, means adapted to project rays of light on said deflector, said deflector adapted to deflect said rays of light against said reflectors and a lens interposed between said projecting means and said deflector and means adapted to guide said deflector arranged so that the same may be moved transversely of said rays of light and toward and away from each of said tubes, respectively, whereby said rays may all gradually be deflected into one of said tubes.

23. A projecting apparatus having, in combination, two projector tubes, a mirror located in the rear end of each of said projector tubes, a deflector located out of alinement with said tubes and embodying two converging mirrors, each adapted to deflect rays of light into one of said tubes, respectively, means adapted to project rays of light against said deflector and means arranged to move said deflector toward and away from the longitudinal median lines of said tubes and transversely of said rays of light whereby all of said rays of light may be deflected into one of said tubes.

24. A projecting apparatus having, in combination, two projector tubes, a frame upon which said tubes are pivotally mounted adjacent to their ends, a reflector adjacent to the rear end of each of said tubes pivotally mounted upon said frame, the median axial line of each of said reflectors and the tube in which it is located coinciding, respectively, with each other, and a deflector movable as one part located out of alinement with said tubes and adapted to deflect rays of light projected thereon against said reflectors, and means arranged to guide said deflector transversely of said rays of light and toward and away from said projector tubes, respectively, whereby said rays may all be gradually deflected into one of said tubes.

25. A projecting apparatus having, in combination, two projector tubes, a frame upon which said tubes are pivotally mounted adjacent to their ends, a reflector adjacent to the rear end of each of said tubes pivotally mounted upon said frame, the median axial line of each of said reflectors and the tube in which it is located coinciding, respectively, with each other, a deflector located out of alinement with said tubes and adapted to deflect rays of light projected thereon against said reflectors, means adapted to project light upon said deflector and means adapted to move said deflector transversely of said rays of light, and toward and away from each of said tubes, respectively.

In testimony whereof I have hereunto set my hand in presence of two subscribing witnesses.

GEORGE L. W. PALMER.

Witnesses:
CHARLES S. GOODING,
SYDNEY E. TAFT.